United States Patent
Tipping et al.

(10) Patent No.: US 6,494,061 B1
(45) Date of Patent: Dec. 17, 2002

(54) APPARATUS AND METHOD FOR CONVEYING GOBS OF GLASS TO A GLASS CONTAINER FORMING MACHINE

(75) Inventors: Mark R. Tipping, Bowling Green, OH (US); Dan M. Hayes, Waterville, OH (US)

(73) Assignee: Owens-Brockway Glass Container Inc., Toledo, OH (US)

(*) Notice: Subject to any disclaimer, the term of this patent is extended or adjusted under 35 U.S.C. 154(b) by 147 days.

(21) Appl. No.: 09/642,348

(22) Filed: Aug. 21, 2000

(51) Int. Cl.$^7$ ................................. C08B 40/04
(52) U.S. Cl. ............... 65/25.1; 65/127; 65/182.2; 65/225; 65/304; 65/356; 65/374.12
(58) Field of Search ............. 65/25.1, 127, 182.2, 65/225, 304, 356, 374.12

(56) References Cited

U.S. PATENT DOCUMENTS

| | | |
|---|---|---|
| 1,638,593 A | 8/1927 | Mulholland |
| 3,198,616 A | 8/1965 | Havens |
| 3,340,038 A | 9/1967 | Hartman |
| 3,650,723 A | 3/1972 | Wiley |
| 3,770,409 A * | 11/1973 | Colchagoff .................. 65/225 |
| 4,529,431 A | 7/1985 | Mumford ..................... 65/225 |
| 4,772,306 A | 9/1988 | Davey et al. ................. 65/325 |
| 5,514,442 A | 5/1996 | Yutaka |

FOREIGN PATENT DOCUMENTS

| | | | |
|---|---|---|---|
| JP | 63-236718 | * | 10/1988 |
| JP | 2-14839 | * | 1/1990 |
| JP | 5-147949 | * | 6/1993 |

* cited by examiner

Primary Examiner—Sean Vincent

(57) ABSTRACT

An inclined trough assembly (10) for conveying, by gravity, formable gobs of glass at an elevated temperature to a section of a glass container forming machine of the I.S. type, the trough assembly having a trough member (12) configured, in cross-section, generally corresponding to that of an upwardly facing V and a manifold (14) at least partly underlying the trough member and having a configuration, in cross-section, generally corresponding to that of an upwardly facing U. The trough member 12 is inserted into the manifold partly to the bottom thereof, and the manifold has a compressed air inlet (14a) for receiving compressed or fan air to flow along the manifold in cooling contact with the trough member to cool the trough member and thereby reduce the coefficient of friction between the gobs of glass flowing through the trough assembly and the trough member thereof. The trough member has an opposed pair of legs (12a, 12b) joined at the bottoms thereof in a bight (12c), the upper free ends of the legs being spaced apart a greater distance than the width of gobs of the largest size in a wide range of sizes of gobs to be passed through the trough assembly, the bight having a radius greater than the width of gobs of the smallest size in the range of sizes. The trough member has a plurality of apertures (12e) extending therethrough, to permit compressed or fan air flowing in the manifold to flow into the trough member, to thereby further cool the trough member and at least partly levitate the gobs in the trough member to further reduce frictional forces acting on the gobs as they flow through the trough assembly.

5 Claims, 1 Drawing Sheet

APPARATUS AND METHOD FOR CONVEYING GOBS OF GLASS TO A GLASS CONTAINER FORMING MACHINE

FIELD OF THE INVENTION

This invention relates to a relatively fixed device for transferring gobs of molten glass from an oscillating gob scoop to a blank mold of one of a plurality of side-by-side sections of a glass container forming machine of the individual section (I.S.) type. More particularly, this invention relates to a downwardly inclined device of the foregoing character, which is usually referred to as a trough, through which gobs pass in series enroute from the oscillating gob scoop to an I.S. machine section blank mold.

BACKGROUND OF THE INVENTION

Most bottles and jars and other types of glass containers are now formed on an I.S. machine, which typically is made up of a multiplicity of like side-by-side container forming sections, for example eight or ten or even twelve such sections. Further, in higher productivity versions of I.S. machines, a multiplicity of like containers are simultaneously formed at each I.S. machine section, for example, two or three or even four such containers, by processes often described as the double gob process, the triple gob process or the quad process, respectively. In any case, each container formed by an I.S. machine section is formed from a gob of formable, molten glass in a two-step process. In the first of these steps, a preform of the container, which is often described as a blank or a parison, is formed in a first mold, often referred to as a blank mold, by blowing or pressing. The blank or parison, which is formed in an inverted position, that is, with its upper opening positioned beneath its bottom, is then transferred, by a 180° turning motion in a vertical plane, to a second mold, usually referred to as the blow mold, where it is blown into its final configuration, while in its normal upright orientation, after which the container along with the other containers simultaneously formed at such I.S. machine section are transferred out of the I.S. machine for further processing.

A delivery system for delivering gobs of molten glass from an oscillating gob scoop to an I.S. machine blank mold is made up of a pair of devices that are fixed, though adjustably so, these devices being a straight, downwardly inclined trough that receives gobs from the oscillating gob scoop and a downwardly inclined deflector, which has a downwardly curved portion, that receives gobs from the trough and directs them to an I.S. machine section blank mold. This general arrangement is described in U.S. Pat. No. 4,529,431 (Mumford), which is assigned to a predecessor of the assignee of this application, the disclosure of which is incorporated by reference herein.

Gob delivery troughs of the type described above typically have a cross-section of an upwardly facing U, with the spacing between the legs of the U being determined by the size of the gobs to be passed therethrough Thus, it has been necessary to replace gob delivery troughs for each I.S. machine section blank mold when it is desired to form containers of a substantially different size from the containers previously formed by such machine, which requires that the size of the gobs being delivered to the machine be increased or decreased accordingly. Heretofore, the replacement of troughs and deflectors has been frequently required for I.S. machines used to produce a wide variety of types and sizes of containers, and each such replacement is labor intensive, and therefore expensive, and time consuming, during which no containers are being produced by the I.S. machine.

It has also been determined that the time required for each gob to travel through a trough on its travel from an oscillating scoop to a blank mold can vary depending on the temperatures of the trough, because the coefficient of friction between the gob and the trough is higher when the temperatures of the trough are higher. This effect is more pronounced in I.S. machines with a relatively large number of sections, for example, ten or twelve sections, because the gob travel distances are longer to the blank molds of the outboard sections of the machine than to the interior sections of the machine. This phenomenon indicates the desirability of positively cooling the troughs and the deflectors of an I.S. machine, or at least those leading to the outboard sections of the machine, but the capital cost of doing so when a plurality of sets of troughs is required for each I.S. machine to accommodate a variety of gob sizes to be processed by the machine is a major deterrent to the use of positive cooling of troughs.

Another problem associated with prior art gob troughs arises from the fact that liquid coolant of the type used to cool shear devices that are used to shear gobs from streams of molten glass tends to flow downwardly through the troughs and tends to undesirably overcool or chill any portion of the gobs that may contact the bottom of the trough as they flow through the trough.

SUMMARY OF THE INVENTION

The aforesaid and other problems associated with prior art glass gob delivery troughs, are solved by glass gob delivery troughs according to the present invention. Illustratively, a gob delivery trough according to the present invention has a cross-section of an upwardly facing V with a space between its opposed legs greater than that required for the largest gob to be passed therethrough The space between the opposed legs of the V varies from a greater space at the top or open end of the V to a substantially lesser space at the bottom or closed end of the V, the space at the top or upper end of the V being greater than the width of the largest gob to be passed through the trough, and the space at the bottom or closed end of the V being greater than the width of the smallest gob to be passed therethrough This ensures that all gobs over a wide size range can be passed through the trough without the need to replace the trough to accommodate gobs of various sizes within the range, while also ensuring that no gob within the size range will be in contact with the bottom of the trough, and, therefore, out of contact with any liquid coolant flowing through the trough Further, a trough according to the present invention can be provided with an underlying air manifold for introducing compressed or fan air into the trough, through openings in the trough, to equalize trough to trough temperatures within the various troughs used on any given I.S. machine, and thereby provide more uniformity in the arrival times of the gobs at the various sections of the I.S. machine, notwithstanding inherent variations in the lengths of the troughs of an I.S. machine. This cooling air, if desired, can also be used to partly levitate the glass gobs in the trough, to speed up the travel of gobs through the trough.

Accordingly, it is an object of the present invention to provide an improved trough for conveying gobs of molten glass from an oscillating gob scoop to a blank mold of an I.S. glass forming machine. More particularly, it is an object of the present invention to provide a trough of the foregoing character that is capable of handling a wide range of sizes of gobs, to eliminate the need for frequent replacement of troughs on an I.S. machine when the machine is converted to the manufacture of glass containers of a different size, from glass gobs of a different size. Even more particularly, it is an object of the present invention to provide a trough of the foregoing character that is shaped to ensure that gobs passing therethrough will be maintained out of contact with any liquid coolant that may be flowing through the trough at the bottom thereof.

For a further understanding of the present invention, and the objects thereof, attention is directed to the drawing and the following brief description thereof, to the detailed description of the preferred embodiment and to the appended claims.

IN THE DRAWINGS

DETAILED DESCRIPTION OF THE PREFERRED EMBODIMENT

Figure 3:
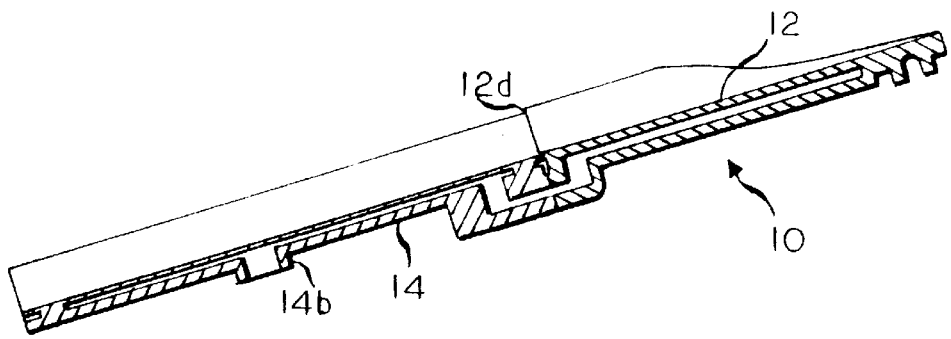
FIG. 3 is a cross-sectional view taken on line 3—3 of FIG. 2.
Figure 1:
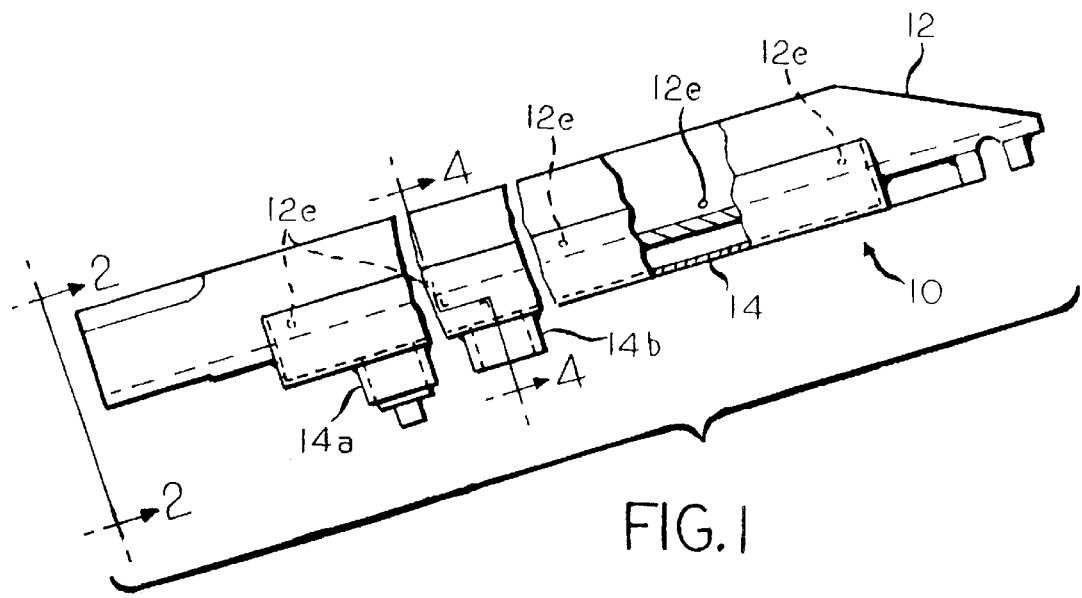
FIG. 1 is an elevation view, partly in cross-section, of a glass gob delivery trough assembly according to a preferred embodiment of the present invention.
Figure 2:
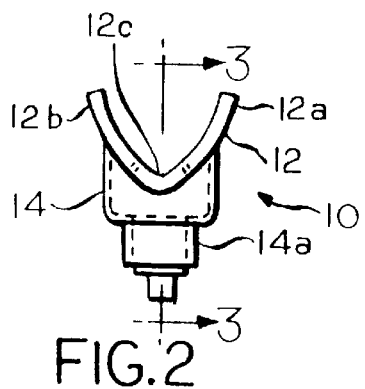
FIG. 2 is an end view of the trough of FIG. 1 taken on line 2—2 of FIG. 1.
Figure 4:
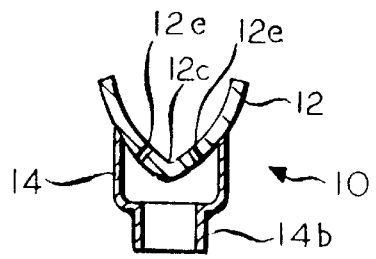
FIG. 4 is a sectional view taken on line 4—4 of FIG. 1.

A glass gob delivery trough assembly according to the preferred embodiment of the present invention is generally identified by reference numeral 10 in the drawing, and the trough assembly 10 includes a downwardly extending trough member 12 that is generally V-shaped in cross-section, with an opposed pair of spaced apart converging legs 12a, 12b joined at a bight 12c at a bottom, closed end of the trough member 12, the trough member preferably being formed, in cross-section, in a single piece. The space between the legs 12a, 12b of the trough member 12, at the free ends thereof, is wider than the widest gob of a wide range of formable glass gobs to be passed through the trough assembly 10, and a radius of the bight 12c at the bottom of the trough member 12 is smaller than the smallest gob of the glass gobs to be passed through the trough assembly 10. Thus, all gobs in the range of gobs to be passed through the trough assembly 10 will be supported along the sides of the legs 12a, 12b, regardless of the size of such gobs, and none of the gobs in such range of gob sizes will be in contact with the bight 12c of the trough member 12. Keeping gobs out of contact with the bight 12c of the trough member 12 is important for process reasons, because liquid coolant from a gob shearing device, which is used to cool shear blades of such a device, may be flowing downwardly through the trough assembly 10 near the bottom or bight 12c of the trough member 12 thereof. As shown in FIG. 1, the trough member 12 may be formed of elements joined end to end, for example, at a juncture 12d.

A multitude of trough assemblies 10 must be used in each I.S. glass container forming machine, one such trough assembly 10 for each section of the forming machine, and typically there are eight, ten or twelve sections in each forming machine. The trough assemblies 10 for each machine, which may otherwise be the same in construction, must vary in length because each trough assembly 10 delivers gobs of formable glass to the forming machine from points on a common circular arc to machine sections that vary in distance from the common circular arc. Thus, gobs going to a more distant section tend to arrive at the section somewhat later than gobs arriving at a closer section, and this is a machine timing disadvantage because machine timing systems are based on the assumption that all gobs have arrived at their designated sections before further processing steps will begin To make gob arrival times more uniform, each trough member 12 is air cooled by compressed or fan air introduced into the associated trough assembly 10 from a manifold 14 that underlies the trough member 12, the manifold 14 being configured as an upwardly facing U with the trough member 12 extending downwardly into the manifold 14 partly to the bottom thereof. Compressed or fan air is introduced into the manifold 14 through an inlet 14a and flows through the manifold 14 to an outlet 14b, some of the air flowing into the trough member 12 through apertures 12e therein The air flowing into the manifold, whether it stays in the manifold until it reaches the outlet 14b or flows into the trough member 12 through the apertures 12e, tends to cool the trough member 12 and the gobs flowing therethrough, and this reduces the coefficient of friction between the gobs and the trough member 12, and thereby speeds up the passage of the gobs through the associated trough assembly 10. Air introduced into a trough member 12 from a manifold 14, through the apertures 12e in the trough member 12, also tends to levitate the gobs passing through the trough member 12, which further reduces the coefficient of friction between the gobs and the trough member 12. Thus, by regulating the flow of compressed or fan air through the trough assemblies 10 of a given glass container forming machine, on a trough assembly 10 by trough assembly 10 basis, it is possible to substantially equalize the arrival times of the gobs at the various machine sections, notwithstanding variations in lengths of the paths traveled by gobs in reaching their designated machine sections, and this factor helps to improve the productivity of a given glass container forming machine. Moreover, the use of a trough member 12 with a cross-section that is capable of delivering a wide range of gob sizes, as is a trough member 12 as heretofore described, improves machine productivity by reducing the frequency with which the trough assemblies 10 need to be replaced to accommodate gobs of different sizes as the forming machine is changed to produce containers of different sizes.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scoping limited solely by the terms of the following claims and the legal equivalents thereof.

What is claimed is:

1. A trough assembly for conveying gobs of formable glass along a downwardly inclined path from an oscillating distributor of an I.S. glass container forming machine, said trough assembly comprising:

a trough member having a configuration, in cross-section, generally corresponding to that of an upwardly facing V with an opposed pair of legs joined, at bottom ends thereof, in a rounded bight, the legs being spaced apart, at upper free ends, by a greater distance than a width of a largest gob in a wide range of gob sizes to be passed through the trough assembly, the bight having a radius smaller than a smallest size of the gobs in the range of gob sizes, the trough member being metallic in composition throughout the bight;

a manifold underlying the trough member and extending for a substantial distance along the trough member, the manifold having a configuration, in cross-section, of an upwardly facing U, the trough member being inserted in the manifold partly to a bottom thereof; and means for causing compressed or fan air to flow into the manifold to cool the trough member.

2. A trough assembly according to claim 1 wherein the trough member has a plurality of apertures extending therethrough, the apertures serving to permit compressed or fan air from the manifold to flow into the trough member to further cool the trough member and to at least partly levitate the gobs of glass flowing therethroug.

3. A trough assembly according to claim 1 wherein the trough member comprises:

an inlet element for receiving gobs of glass from the oscillating distributor; and an outlet element removably attached to said inlet element for receiving gobs of glass from said inlet element;

said inlet element and said outlet element being joined end to end at a juncture;

said manifold at least partly underlying each of said inlet element and said outlet element.

4. A gravity method of conveying gobs of formable glass of a size in a wide range of sizes from a source of such gobs to a section of a glass container forming machine, the method comprising:

providing a downwardly inclined trough assembly having an upper, gob receiving inlet end and a lower, outlet end, the trough assembly having a configuration generally corresponding to that of an upwardly facing V, the trough assembly further having a manifold at least partly underlying a trough member of the trough assembly, the manifold having a configuration corresponding to an upwardly facing U with the trough member being inserted in the manifold partly to a bottom thereof, the trough member having an opposed pair of legs joined at bottom ends of the legs in a bight, the legs being separated at upper free ends by a distance greater than a width of gobs in a largest size of gobs in the range to be passed through the trough assembly, the bight having a radius less than a width of gobs in a smallest size of gobs in the range to be passed through the trough assembly, whereby any gob passing liquid coolant flowing through the trough assembly is maintained out of contact with any cooling liquid flowing through the trough member for all gobs of all sizes in the range being conveyed through the trough assembly, the trough member being metallic in composition throughout the bight; and introducing compressed or fan air into the manifold to at least partly cool the trough member to thereby reduce the coefficient of friction between the trough member and the gobs being conveyed therethrough.

5. The method according to claim 4 wherein the trough member further has a plurality of apertures extending therethrough to permit compressed or fan air flowing through the manifold to flow into the trough member, thereby to further cool the trough member and at least partly levitate the gobs passing through the trough assembly to further reduce frictional forces acting on the gobs as they pass through the trough assembly.

* * * * *